United States Patent
Kozaki

(10) Patent No.: US 11,223,052 B2
(45) Date of Patent: Jan. 11, 2022

(54) FUEL-CELL SEPARATOR

(71) Applicant: TOYOTA JIDOSHA KABUSHIKI KAISHA, Toyota (JP)

(72) Inventor: Tomoko Kozaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 127 days.

(21) Appl. No.: 16/236,810

(22) Filed: Dec. 31, 2018

(65) Prior Publication Data

US 2019/0221861 A1    Jul. 18, 2019

(30) Foreign Application Priority Data

Jan. 16, 2018   (JP) .............................. JP2018-005124

(51) Int. Cl.
*H01M 8/0217* (2016.01)
*H01M 8/0228* (2016.01)

(52) U.S. Cl.
CPC ....... *H01M 8/0217* (2013.01); *H01M 8/0228* (2013.01)

(58) Field of Classification Search
CPC .......................... H01M 8/0217; H01M 8/0228
See application file for complete search history.

(56) References Cited

U.S. PATENT DOCUMENTS

2012/0231352 A1*   9/2012   Pol ......................... H01M 4/587
                                                                  429/341

FOREIGN PATENT DOCUMENTS

| CN | 102593479 A | | 7/2012 |
|---|---|---|---|
| CN | 103553120 A | * | 2/2014 |
| JP | 08-185870 A | | 7/1996 |
| JP | 10-053418 A | | 2/1998 |
| JP | 2013-077436 A | | 4/2013 |
| JP | 2017199535 A | | 11/2017 |

(Continued)

OTHER PUBLICATIONS

Yuan-Qing Li, Jian-Lei Wang, Shao-Yun Fu, Shi-Gang Mei, Jian-Min Zhang, and Kang Yong, "Facile synthesis of antimony-doped tin oxide nanoparticles by a polymer-pyrolysis method", Materials Research Bulletin 45, pp. 677-681, published Mar. 9, 2010. (Year: 2010).*

*Primary Examiner* — Jonathan G Jelsma
(74) *Attorney, Agent, or Firm* — Dickinson Wright, PLLC

(57) ABSTRACT

The disclosure provides a fuel-cell separator excellent in conductivity and a method for producing the separator.
A fuel-cell separator comprising a metal substrate and a surface layer formed on a surface of the substrate, wherein the surface layer comprises an antimony-containing tin oxide film in an outermost surface thereof, and the antimony-containing tin oxide film has a value (%) representing orientation of the (200) plane and calculated in accordance with Expression (1):

[Mathematical Expression 1]

$$\frac{\text{Peak intensity of (200) plane}/21}{\text{Peak intensity of (110) plane}/100 + \text{peak intensity of (101) plane}/75 + \text{peak intensity of (200) plane}/21} \times 100 \quad \text{Expression (1)}$$

where individual peak intensity values are obtained by X-ray diffraction, of 35 or more.

5 Claims, 1 Drawing Sheet

(56) References Cited

FOREIGN PATENT DOCUMENTS

WO     WO-03092139 A2 * 11/2003 .......... H01M 8/0204
WO     WO-2017199535 A1 * 11/2017 ............. A61B 1/051

* cited by examiner

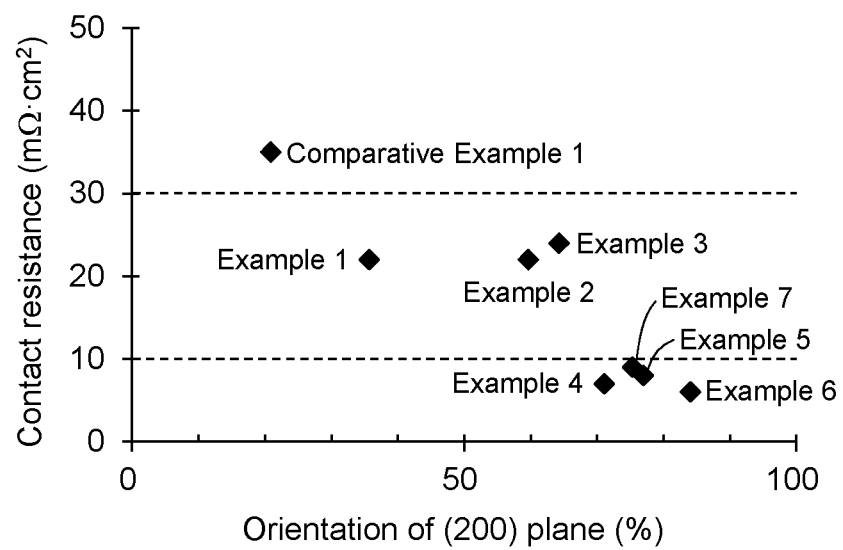

FUEL-CELL SEPARATOR

CROSS REFERENCE TO RELATED APPLICATIONS

The present application claims priority from Japanese patent application JP 2018-005124 filed on Jan. 16, 2018, the content of which is hereby incorporated by reference into this application.

BACKGROUND

Technical Field

The disclosure relates to a fuel-cell separator and a production method of the separator.

Background Art

A fuel cell is a battery cell in which a combustible chemical substance such as hydrogen, carbon monoxide and hydrocarbon or a fuel containing such a substance is used as an active material; an oxidation reaction of the chemical substance or fuel is electrochemically performed to directly convert an energy change in the oxidation process into electric energy. A high energy conversion efficiency can be expected.

For example, JP Patent Publication (Kokai) No. 8-185870 A (1996) describes a fuel-cell separator, which is formed by providing a protective film of Sb-doped tin oxide to a separator substrate constituted of a cermet consisting of a refractory metal and a ceramic. According to the patent publication (JP Patent Publication (Kokai) No. 8-185870 A (1996)), the separator has high density, high strength and satisfactory electric conductivity and excellent heat-resistance and corrosion resistance, and further has satisfactory separator properties: thermal expansion characteristics such as a coefficient of thermal expansion can be adjusted, as well as no negative effect on a cathode. However, the fuel-cell separator has the following problem. Since the interlayer contact resistance with, e.g., a carbon material, is not sufficiently reduced, the conductivity thereof is not sufficient.

JP Patent Publication (Kokai) No. 2013-77436 A describes a separator constituted of a substrate formed of a metal material and a thin film layer of a conductive metal oxide formed on a surface of the substrate. According to the patent publication (JP Patent Publication (Kokai) No. 2013-77436 A), it is described that the conductive metal oxide preferably contains at least one element selected from the group consisting of tin, tantalum, niobium, titanium, tungsten and zirconium. The separator (metal separator) formed of a metallic material has been pointed out to have the following problem: metal ions are dissolved from the metal separator by corrosion, flow into an electrolyte film, and react with a peroxide produced within the fuel cell to generate radicals which damage the electrolyte film, with the result that deterioration of electrolyte film is accelerated. The patent publication (JP Patent Publication (Kokai) No. 2013-77436 A) describes that dissolution of metal ions can be suppressed by the separator. According to the patent publication (JP Patent Publication (Kokai) No. 2013-77436 A), the thin film layer can be formed by a physical vapor deposition method (sputtering method, ion plating method) or a chemical vapor deposition method. However, the physical vapor deposition method has problems: long processing time and use of an expensive apparatus, because processing is carried out under a reduced-pressure atmosphere. The chemical vapor deposition method has the following problem: high cost of a raw material, because the raw-material must be vaporized under normal pressure or reduced pressure.

JP Patent Publication (Kokai) No. 10-53418 A (1998) describes that a tin oxide film (TO) selectively oriented in the (200) plane is formed on a glass substrate by a spray thermal degradation technique using an organic solvent (dibutyltin diacetate) solution; and further, a tin oxide film (ATO or FTO) containing an element such as antimony or fluorine, the number of the outermost shell electrons of which is larger by one than that of tin or oxygen, is formed by a spray thermal degradation technique using an organic solvent solution containing an element such as antimony or fluorine, the number of the outermost shell electrons of which is larger by one than that of tin or oxygen. According to the patent publication (JP Patent Publication (Kokai) No. 10-53418 A (1998)), it is described that the tin oxide thin-film has high orientation, low resistance and excellent transparency. However, the tin oxide thin-film has a problem of high raw-material cost, because dibutyltin diacetate used as a raw material in forming a film by the spray thermal degradation technique is expensive.

It has been still required for a separator as described above to be further suitable for use in fuel cells and to have sufficiently high conductivity. Also, a fuel-cell separator excellent in conductivity and an economical method for producing the separator are required.

SUMMARY

The disclosure provides a fuel-cell separator excellent in conductivity and a production method of the separator.

The present inventors conducted studies on a means for solving the above problems. As a result, they found that the conductivity of the separator to be obtained can be improved by forming a surface layer on a metal substrate, the surface layer comprising, in the outermost surface, an antimony-containing tin oxide film in which the value representing orientation of the (200) plane and calculated in accordance with Expression (1) is a predetermined value or more. The present inventors also found that the antimony-containing tin oxide film can be formed by using a solution containing inexpensive raw materials, i.e., tin chloride and antimony chloride, by specifically setting conditions.

More specifically, the disclosure is summarized as follows:

[1] A fuel-cell separator comprising a metal substrate and a surface layer formed on a surface of the substrate, wherein the surface layer comprises an antimony-containing tin oxide film in an outermost surface thereof, and the antimony-containing tin oxide film has a value (%) representing orientation of the (200) plane and calculated in accordance with Expression (1):

[Mathematical Expression 1]

$$\frac{\text{Peak intensity of (200) plane}/21}{\text{Peak intensity of (110) plane}/100 + \text{peak intensity of (101) plane}/75 + \text{peak intensity of (200) plane}/21} \times 100 \qquad \text{Expression (1)}$$

where individual peak intensity values are obtained by X-ray diffraction, of 35 or more.

[2] The fuel-cell separator according to [1], wherein the value (%) representing orientation of the (200) plane and calculated in accordance with Expression (1) is 70 or more.
[3] The fuel-cell separator according to [1] or [2], wherein an antimony content in the antimony-containing tin oxide film is 0.2 atom % to 10 atom %.
[4] The fuel-cell separator according to any one of [1] to [3], wherein the antimony-containing tin oxide film has a film thickness of 50 nm or more.
[5] A method for producing the fuel-cell separator according to any one of [1] to [4], comprising atomizing a solution containing tin chloride and antimony chloride by ultrasonic wave and supplying the obtained mist-like solution onto a substrate heated to 300° C. to 600° C. to thereby form an antimony-containing tin oxide film.

The fuel-cell separator of the disclosure is excellent in conductivity. According to the method of the disclosure for producing a fuel-cell separator, the fuel-cell separator can be produced at low cost.

BRIEF DESCRIPTION OF THE DRAWING

FIG. 1 is a graph showing the results of a conductivity evaluation test.

DETAILED DESCRIPTION

The disclosure relates to a fuel-cell separator comprising a metal substrate and a surface layer formed on a surface of the substrate, characterized in that the surface layer comprises an antimony-containing tin oxide film in an outermost surface thereof, and
the antimony-containing tin oxide film has a value (%) representing orientation of the (200) plane and calculated in accordance with Expression (1):

[Mathematical Expression 2]

$$\frac{\text{Peak intensity of (200) plane}/21}{\text{Peak intensity of (110) plane}/100 + \text{peak intensity of (101) plane}/75 + \text{peak intensity of (200) plane}/21} \times 100 \quad \text{Expression (1)}$$

where individual peak intensity values are obtained by X-ray diffraction, of 35 or more (hereinafter referred to also as the separator of the disclosure). For the separator of the disclosure, the surface layer thereof comprises, in the outermost surface thereof, an antimony-containing tin oxide film in which a value (%) representing orientation of the (200) plane is a predetermined value or more, and therefore the interlayer contact resistance with, e.g., a carbon material, is reduced.

The metal substrate is not particularly limited as long as it is usually used in the separators of fuel cells. Examples of the metal substrate include titanium, iron and aluminum; austenitic stainless steels such as SUS304, SUS305, SUS310, SUS316 and SUSMX7; and ferritic stainless steels such as SUS430. In view of pitting-corrosion resistance and metal dissolution resistance, titanium is used in some embodiments.

The separator of the disclosure has a surface layer formed on a surface of a metal substrate. The surface layer contains a specified antimony-containing tin oxide film in an outermost surface thereof. The specified antimony-containing tin oxide film may be constituted of a tin oxide film or an antimony-containing tin oxide film (a first layer) formed relatively closely to the surface of the substrate and an antimony-containing tin oxide film (a second layer) on the first layer. Alternatively, the specified antimony-containing tin oxide film of the disclosure may be constituted of a single antimony-containing tin oxide film. The former case is preferable in the sense that the orientation of the (200) plane can be improved by the presence of the first layer, thereby improving performance; whereas, the latter case is preferable in the sense that production can be made in a few number of steps and production cost and time can be reduced.

In some embodiments, the antimony-containing tin oxide film contained in the outermost surface of the surface layer has the value (%) representing orientation of the (200) plane and calculated in accordance with Expression (1) is 35 or more, in order to obtain high conductivity. In some embodiments, the antimony-containing tin oxide film contained in the outermost surface of the surface layer has the value (%) representing orientation of the (200) plane and calculated in accordance with Expression (1) is 70 or more, in order to obtain high conductivity. The upper limit of the value (%) representing orientation of the (200) plane, which is not particularly limited, can be, for example, 95 or less or 90 or less. The separator of the disclosure has low contact resistance due to high orientation of the (200) plane and has high conductivity. In contrast, for example, if the crystal of the antimony-containing tin oxide film is oriented at random, the (110) plane and the (101) plane have high contact resistance, with the result that electrical characteristics are considered to deteriorate. The value representing the orientation of the (200) plane can be measured by the method described in, for example, in the following section <Evaluation method for film>, "(3) XRD analysis".

In Expression (1), peak intensities of the (200) plane, (110) plane and (101) plane are values obtained by X-ray diffraction. The values by which the peak intensity values are divided correspond to I(f) values of individual surfaces of JCPDS card No. 41-1445. Similarly, the values (%) representing the orientation of (110) plane and (101) plane are respectively calculated in accordance with the following Expressions (2) and (3):

[Mathematical Expression 3]

$$\frac{\text{Peak intensity of (110) plane}/100}{\text{Peak intensity of (110) plane}/100 + \text{peak intensity of (101) plane}/75 + \text{peak intensity of (200) plane}/21} \times 100 \quad \text{Expression (2)}$$

$$\frac{\text{Peak intensity of (101) plane}/75}{\text{Peak intensity of (110) plane}/100 + \text{peak intensity of (101) plane}/75 + \text{peak intensity of (200) plane}/21} \times 100 \quad \text{Expression (3)}$$

In some embodiments, for the antimony-containing tin oxide film contained in the outermost surface of the aforementioned surface layer, the content of antimony in the antimony-containing tin oxide film is 0.2 atom % to 10 atom % in view of improving electrical characteristics by increasing carrier concentration. In some embodiments, for the antimony-containing tin oxide film contained in the outermost surface of the aforementioned surface layer, the content of antimony in the antimony-containing tin oxide film is 0.2 atom % to 5 atom % in view of improving electrical characteristics by increasing carrier concentration. In some embodiments, for the antimony-containing tin oxide film contained in the outermost surface of the aforementioned surface layer, the content of antimony in the antimony-containing tin oxide film is 0.2 atom % to 3 atom % in view of improving electrical characteristics by increasing carrier concentration. If antimony is excessively contained, a trivalent antimony oxide is produced, which may deteriorate electrical characteristics. In some embodiments, if the specified antimony-containing tin oxide film is constituted of a tin oxide film or an antimony-containing tin oxide film (the first layer) relatively closely formed to the surface of the substrate and an antimony-containing tin oxide film (the second layer) on the first layer, the content of antimony in the first layer is 0 atom %, or 0.2 atom % to 10 atom % or 0.2 atom % to 5 atom % or 0.2 atom % to 3 atom %; and the content of antimony in the second layer is 0.2 atom % to 10 atom % or 0.2 atom % to 5 atom % or 0.2 atom % to 3 atom %. The content of antimony in the antimony-containing tin oxide film can be measured by the method described in, for example, in the following section <Evaluation method for film>, "(2) Measurement of antimony content in film".

In some embodiments, the thickness of the antimony-containing tin oxide film contained in the outermost layer of the aforementioned surface layer is 50 nm or more, in order to obtain excellent corrosion resistance. In some embodiments, the thickness of the antimony-containing tin oxide film contained in the outermost layer of the aforementioned surface layer is 60 nm to 400 nm, in order to obtain excellent corrosion resistance. In some embodiments, the thickness of the antimony-containing tin oxide film contained in the outermost layer of the aforementioned surface layer is 80 nm to 380 nm, in order to obtain excellent corrosion resistance. In some embodiments, if the antimony-containing tin oxide film is formed of a single layer consisting of an antimony-containing tin oxide film, the thickness of the antimony-containing tin oxide film is 50 nm or more, in order to obtain excellent corrosion resistance. In some embodiments, if the antimony-containing tin oxide film is formed of a single layer consisting of an antimony-containing tin oxide film, the thickness of the antimony-containing tin oxide film is 80 nm to 400 nm, in order to obtain excellent corrosion resistance. In some embodiments, if the specified antimony-containing tin oxide film is constituted of a tin oxide film or an antimony-containing tin oxide film (a first layer) formed relatively closely to the surface of the substrate and an antimony-containing tin oxide film (a second layer) on the first layer, the total film thickness of the first layer and the second layer is 50 nm or more. In some embodiments, the film thickness of the first layer is 10 nm to 100 nm in order to produce initial crystal grains oriented in the (200) plane; and the film thickness of the second layer is 40 nm to 250 nm, in order to obtain excellent corrosion resistance. In some embodiments, the film thickness of the first layer is 10 nm to 100 nm in order to produce initial crystal grains oriented in the (200) plane; and the film thickness of the second layer is 80 nm to 200 nm, in order to obtain excellent corrosion resistance. The thickness of the antimony-containing tin oxide film can be measured by the method described in, for example, in the following section <Evaluation method for film>, "(5) Measurement of film thickness". As SEM or TEM to be used herein, for example, a scanning electron microscope, JSM-7100F manufactured by JEOL Ltd., is mentioned.

The separator of the disclosure is excellent in conductivity. In some embodiments, when the interlayer contact resistance with, e.g., a carbon material is measured, it can be 30 cm$^2$ or less. In some embodiments, when the interlayer contact resistance with, e.g., a carbon material is measured, it can be 10 mΩ·cm$^2$ or less. The contact resistance can be measured by the method described in, for example, in the following section <Evaluation method for film>, "(1) Evaluation of conductivity". The separator of the disclosure can be excellent in corrosion resistance. When the amounts of metal components of a substrate dissolved is measured by the method described, for example, in the following section <Evaluation method for film>, "(4) Evaluation of corrosion resistance", they can be below the detection limit or less (for example, less than 5 ng/mL).

The disclosure also relates to a method for producing a fuel-cell separator (hereinafter referred to also as the production method of the disclosure). The production method of the disclosure is suitable for producing the separator of the disclosure. The production method of the disclosure is characterized by comprising atomizing a solution containing tin chloride and antimony chloride by ultrasonic wave and supplying the obtained mist-like solution onto a substrate heated to 300° C. to 600° C. to thereby form an antimony-containing tin oxide film (hereinafter referred to as step (a)). Although we do not wish to bind to any specific theory, it is considered that if a solution containing tin chloride and antimony chloride is atomized by a ultrasonic vibration method to obtain droplets of mist uniform in size and the mist is supplied onto a metal substrate heated, the droplets are vaporized before they come into contact with the metal substrate and local chemical vapor deposition can be made. In this manner, it is considered that a high crystalline film can be obtained and conductivity can be improved. If liquid droplets are large or if the temperature of a metal substrate is low, liquid droplets fall on the metal substrate before vaporized. If so, components other than tin and antimony in the liquid droplets are contained in the film, with the result that crystallinity deteriorates and conductivity decreases. The film formation method of step (a) corresponds to a mist CVD method. As to implementation of the mist CVD method, for example, the paper (J. G. Lu et. al., Zno-based thin films synthesized by atmospheric pressure mist chemical vapor deposition, Journal of Crystal Growth 299 (2007) 1-10); and the paper (Takahiro Shirahata et. al., Transparent conductive zinc-oxide-based films grown at low temperature by mist chemical vapor deposition, Thin Solid Films 597 (2015) 30-38) can be referred to. Conditions other than the aforementioned ones for carrying out the production method of the disclosure can be appropriately set by those skilled in the art.

In the step (a), a solution containing tin chloride and antimony chloride is used. Since tin chloride ($SnCl_2$ or $SnCl_4$) and antimony chloride ($SbCl_3$ or $SbCl_5$) are inexpensive (the cost of tin chloride is about ¹⁄₁₀ as low as that of dibutyltin acetate), the production method of the disclosure is economically favorable. In some embodiments, the concentration of tin chloride in the solution is 0.001 mol/L to 1 mol/L and the concentration of antimony chloride is 0.000002 mol/L to 0.1 mol/L. As the solvent for the solution, an organic solvent and water are mentioned. These can be used as a mixture. The organic solvent is not particularly limited as long as it is usually used in the mist CVD method and it can dissolve tin chloride and antimony chloride. At least one solvent selected from monohydric alcohols such as methanol, ethanol, propanol, butanol, pentanol, hexanol, heptanol and octanol can be used singly or as a mixture (two types or more). In some embodiments, if a solvent containing water is used, an acid such as hydrochloric acid and nitric acid is added to the solution in order to dissolve tin chloride and antimony chloride. In some embodiments, the concentration of the acid in the solution containing tin chloride and antimony chloride in order to obtain desired orientation is 0.0001 mol/L to 0.07 mol/L. In some embodiments, the concentration of the acid in the solution containing tin chloride and antimony chloride in order to obtain desired orientation is 0.001 mol/L to 0.01 mol/L.

In the step (a), a solution containing tin chloride and antimony chloride is atomized by ultrasonic wave. In some embodiments, the frequency of the ultrasonic wave in order to obtain liquid droplets having sufficiently small size enough to be vaporized before they come into contact with a metal substrate, is 100 kHz to 5 MHz. In some embodiments, the frequency of the ultrasonic wave in order to obtain liquid droplets having sufficiently small size enough to be vaporized before they come into contact with a metal substrate, is 2.4 MHz.

In the step (a), the mist-like solution obtained by atomization is supplied onto a substrate heated to 300° C. to 600° C. to form an antimony-containing tin oxide film. If a metal substrate is heated to the above temperature, the liquid droplets can be vaporized before they come into contact with the metal substrate to obtain a film having high crystallinity. From the point of view, the substrate is heated to 400° C. to 500° C. in some embodiments. The step (a) is continuously carried out until an antimony-containing tin oxide film having a predetermined film thickness is formed, and thereafter, the heating of the substrate is terminated. In this manner, a desired separator can be obtained. If the specified antimony-containing tin oxide film is constituted of a tin oxide film or an antimony-containing tin oxide film (a first layer) formed relatively closely to the surface of the substrate and an antimony-containing tin oxide film (a second layer) on the first layer, the method of the disclosure may further include, before the step (a), a step (b) of atomizing a solution containing tin chloride and optionally antimony chloride by ultrasonic wave and supplying the obtained mist-like solution onto a substrate heated to 300° C. to 600° C. to thereby form the tin oxide film or the antimony-containing tin oxide film. As the embodiment of step (b), descriptions on the step (a) and the first layer of the separator of the disclosure can be referred to.

Note that, if an antimony-containing tin oxide film is formed by the spray thermal degradation technique without atomization by ultrasonic wave or heating of a substrate, since tin chloride is hardly decomposed, crystallinity and conductivity of the film are considered to be low. If a film is formed by the spray thermal degradation technique at a temperature at which oxidation of a metal substrate itself was suppressed, the film contains impurities and crystallinity thereof decreases, with the result that satisfactory electrical characteristics cannot be obtained and contact resistance presumably increases. In contrast, if the film forming temperature is raised in order to improve crystallinity, growth of the oxidation film on the metal substrate proceeds, with the result that contact resistance increases. Alternatively, if a film containing tin oxide is formed by a sputtering method, the orientation of crystals becomes random, with the results that the (110) plane and the (101) plane which deteriorate electrical characteristics are present in a large ratio. Due to this, the conductivity of the film presumably decreases.

EXAMPLES

The disclosure will be more specifically described by way of Examples. However, the technical scope of the disclosure is not limited by Examples.

<Substrate>

As a metal substrate, a pure titanium plate (thickness: 0.1 mm) was used.

<Raw Material for Antimony-Containing Tin Oxide Film or a Tin Oxide Film>

Material A:

An aqueous solution containing $SnCl_2$ (the concentration of Sn in the resultant aqueous solution is 0.01 mol/L), $SbCl_3$ (the concentration of Sb in the resultant aqueous solution is 0.0005 mol/L), 0.3 mol/L hydrochloric acid (1 vol %) and 0.2 mol/L nitric acid (1 vol %).

Material B:

An aqueous solution containing $SnCl_2$ (the concentration of Sn in the resultant aqueous solution is 0.01 mol/L), 0.3 mol/L hydrochloric acid (1 vol %) and 0.2 mol/L nitric acid (1 vol %).

Material C:

An aqueous solution containing $SnCl_2$ (the concentration of Sn in the resultant aqueous solution is 0.01 mol/L), $SbCl_3$ (the concentration of Sb in the resultant aqueous solution is 0.0005 mol/L), 1.6 mol/L hydrochloric acid (5 vol %), and 0.2 mol/L nitric acid 1 (1 vol %).

<Film Forming Method>

A surface layer was formed on a substrate by using a fine channel-system mist CVD apparatus and in accordance with the mist CVD method.

(1) The substrate was placed on a hot plate.

(2) A mist-like material obtained by atomization was supplied to a surface of the substrate heated to the film-forming temperature shown in the following Table 1. The material herein was atomized by an ultrasonic transducer at 2.4 MHz.

(3) The mist was vaporized on the substrate surface and allowed to perform a chemical reaction on the substrate surface to form an antimony-containing tin oxide film or a tin oxide film. At this time, care was taken so as for the mist not to fall on the substrate in the form of liquid droplets.

(4) When the film growth proceeded and a desired film-thickness shown in the following Table 1 was obtained, raw-material supply was terminated. The substrate was maintained at a predetermined temperature in the steps (2) and (3).

(5) When forming the second layer, the substrate temperature was controlled to be the temperature shown in the following Table 1, and thereafter, the steps (2) to (4) were carried out.

(6) After the temperature of the substrate decreased to 50° C. or less, the substrate was removed from the hot plate.

<Evaluation Method for Film>

(1) Evaluation of Conductivity

In order to measure contact resistance, a gold-plated copper plate was stacked on the film-formation surface of a metal substrate with a carbon paper (TGP-H-120, manufactured by Toray Industries Inc.) interposed between them. A pressure of 0.98 MPa per unit area was applied and a constant current was supplied between the metal substrate and the copper plate. The voltage value at this time was measured.

(2) Measurement of Antimony Content in Film

The detection intensity of Sb binding energy 540 eV was measured by an X-ray photoemission spectroscopy (QuanteraSXM, manufactured by PHI) and converted into a content.

(3) XRD Analysis

Measurement was carried out by using an X-ray diffraction device (SmartLab, Rigaku).

The values (%) representing the orientation of the (200) plane, (110) plane and (101) plane were obtained by calculation in accordance with the following (Expression 1), (Expression 2) and (Expression 3), respectively. Numerical values of 21, 100 and 75, by which the peak intensity values are divided in (Expression 1), (Expression 2) and (Expression 3), respectively, are I(f) values of individual planes of JCPDS card No. 41-1445.

[Mathematical Expression 4]

$$\frac{\text{Peak intensity of (200) plane}/21}{\text{Peak intensity of (110) plane}/100 + \text{peak intensity of (101) plane}/75 + \text{peak intensity of (200) plane}/21} \times 100 \quad \text{Expression (1)}$$

$$\frac{\text{Peak intensity of (110) plane}/100}{\text{Peak intensity of (110) plane}/100 + \text{peak intensity of (101) plane}/75 + \text{peak intensity of (200) plane}/21} \times 100 \quad \text{Expression (2)}$$

$$\frac{\text{Peak intensity of (101) plane}/75}{\text{Peak intensity of (110) plane}/100 + \text{peak intensity of (101) plane}/75 + \text{peak intensity of (200) plane}/21} \times 100 \quad \text{Expression (3)}$$

(4) Evaluation of Corrosion Resistance

A corrosion test at a constant potential was carried out in accordance with the method for high-temperature electrochemical corrosion test of metallic materials (the Japanese Industrial Standards, JIS Z2294). A test piece was soaked in an aqueous sulfuric acid solution controlled at a temperature 80° C. In this state, 0.9V vs the potential of SHE was maintained. NaF was dissolved in the aqueous sulfuric acid solution so as to obtain a fluoride ion concentration of 3000 ppm. The test time was set at 100 hours. After the corrosion resistance test, the amount of a metal-substrate component Ti dissolved was evaluated. If the amount of Ti dissolved was the detection limit or less (less than 5 ng/mL), "good" was given.

(5) Measurement of Film Thickness

A test sample was embedded in a resin and polished. The section of the test sample was observed (by SEM or TEM) to measure the thickness of a film.

The results of the above evaluation tests on the separators obtained in Examples 1 to 7, Comparative Example 1 and Reference Examples 1 and 2 are shown in the following Table 1.

TABLE 1

| | First layer | | | | Second layer | | |
|---|---|---|---|---|---|---|---|
| | Raw material | Film thickness | Film-formation temperature | Film composition | Raw material | Film thickness | Film-formation temperature |
| Example 1 | A | 210 nm | 450° C. | $SnO_2$:Sb | — | — | — |
| Example 2 | A | 352 nm | 450° C. | $SnO_2$:Sb | — | — | — |
| Example 3 | A | 100 nm | 400° C. | $SnO_2$:Sb | — | — | — |
| Example 4 | A | 10 nm | 350° C. | $SnO_2$:Sb | A | 90 nm | 450° C. |
| Example 5 | B | 10 nm | 450° C. | $SnO_2$ | A | 190 nm | 450° C. |
| Example 6 | A | 10 nm | 350° C. | $SnO_2$:Sb | A | 190 nm | 450° C. |
| Example 7 | B | 10 nm | 450° C. | $SnO_2$ | A | 30 nm | 450° C. |
| Comparative Example 1 | C | 100 nm | 450° C. | $SnO_2$:Sb | — | — | — |
| Reference Example 1 | A | 50 nm | 450° C. | $SnO_2$:Sb | — | — | — |
| Reference Example 2 | A | 70 nm | 450° C. | $SnO_2$:Sb | — | — | — |

| | Second layer Film composition | Orientation (110) | (101) | (200) | Contact resistance (mΩ·cm²) | Corrosion resistance evaluation results |
|---|---|---|---|---|---|---|
| Example 1 | — | 64 | 1 | 36 | 22 | Good |
| Example 2 | — | 40 | 0 | 60 | 22 | Good |
| Example 3 | — | 23 | 13 | 64 | 24 | Good |
| Example 4 | $SnO_2$:Sb | 24 | 5 | 71 | 7 | Good |
| Example 5 | $SnO_2$:Sb | 22 | 1 | 77 | 8 | Good |
| Example 6 | $SnO_2$:Sb | 9 | 7 | 84 | 6 | Good |
| Example 7 | $SnO_2$:Sb | 18 | 7 | 75 | 9 | 5 ng/mL or more |
| Comparative Example 1 | — | 75 | 4 | 21 | 35 | Good |
| Reference Example 1 | — | — | — | — | 32 | Good |
| Reference Example 2 | — | — | — | — | 25 | Good |

With respect to the separators obtained in Examples 1 to 4, 6, Comparative Example 1 and Reference Examples 1 and 2, Sb concentration in the antimony-containing tin oxide film was 2 atom %. With respect to the separators obtained in Examples 5 and 7, the Sb concentration of the antimony-containing tin oxide film (formed of the first layer and the second layer) was 0.2 atom %.

From the above results, it is found that the separators obtained in Examples 1 to 7, whose value (%) representing orientation of the (200) plane and calculated in accordance with Expression (1) are high (35 or more), are low in contact resistance (30 mΩ·cm² or less). It is also found that the cases where the value (%) representing orientation of the (200) plane and calculated in accordance with Expression (1) are 70 or more are further reduced in contact resistance (10 mΩ·cm² or less) and excellent in conductivity. It is further found that the separators obtained in Examples 1 to 6 having a thickness of the antimony-containing tin oxide film of 50 nm or more show satisfactory corrosion resistance evaluation results.

From Example 1 and Example 2, it is found that since the (200) plane is preferentially grown as the thickness of the antimony-containing tin oxide film increases, the value representing the orientation of the (200) plane increases; and that the contact resistance is high in Comparative Example 1 where the value representing orientation of the (200) plane is low (FIG. 1). Since the film-forming temperature is low in Example 3, the value representing orientation of the (200) plane is considered to increase.

In the evaluation of conductivity, the area (real contact area) actually in contact with an antimony-containing tin oxide (ATO) relative to the area (apparent contact area) in contact with carbon paper is estimated to be about 1%. This area (about 1%) is estimated to consist of contact points having a diameter of 200 to 300 nm. The ATO film having a thickness of 50 nm or more and produced by the mist CVD method is estimated to consist of columnar crystals having a diameter of 10 to 50 nm. From this, it is considered that the number of ATO columnar crystals in contact with the carbon paper by point contact are about 4 to 30. The contact resistance is produced herein. This is because the real contact area is small compared to the apparent contact area and thus current is converged to the contact point near the contact point. Because of this, as the number of contact points increases, the resistance is considered to decrease. ATO columnar crystals oriented in the (110) plane and the (101) plane herein have poor electrical characteristics at the outermost surface. Because of this, it is presumed that current selectively flows through low-resistant columnar crystals oriented in the (200) plane. From this, it is considered that as the number of columnar crystals oriented in the (200) plane having satisfactory electrical characteristics increases, contact resistance decreases. If the value (%) representing orientation of the (200) plane and calculated in accordance with Expression (1) becomes 35 or more, columnar crystals oriented in the (200) plane come to be present at almost all contact points, with the result that the state where contact resistance is sufficiently reduced, is presumably obtained. Further, if the value (%) representing orientation of the (200) plane and calculated in accordance with Expression (1) becomes 70 or more, it is presumed that columnar crystals oriented in the (200) plane come into contact with each other and are connected along in the horizontal direction of the substrate over the entire film. Because of this, since current flows through the columnar crystals oriented in the (200) plane and connected over the entire ATO film and spreads in the horizontal direction to the substrate, the resistance produced by convergence of current near the contact points is reduced. In this way, contact resistance is presumably reduced.

All publications, patent and patent applications cited herein are incorporated herein by reference in their entirety.

What is claimed is:

1. A fuel-cell separator comprising a metal substrate and a surface layer formed on a surface of the substrate, wherein
    the surface layer comprises an antimony-containing tin oxide film in an outermost surface thereof,
    the antimony-containing tin oxide film comprises a first layer being a tin oxide film or an antimony-containing tin oxide film formed relatively closely to the surface of the substrate, and a second layer being an antimony-containing tin oxide film on the first layer, and
    the antimony-containing tin oxide film has a value (%) representing orientation of the (200) plane and calculated in accordance with Expression (1):

[Mathematical Expression 1]

$$\frac{\text{Peak intensity of (200) plane}/21}{\text{Peak intensity of (110) plane}/100 + \text{peak intensity of (101) plane}/75 + \text{peak intensity of (200) plane}/21} \times 100 \quad \text{Expression (1)}$$

where individual peak intensity values are obtained by X-ray diffraction, of 70 or more.

2. The fuel-cell separator according to claim 1, wherein an antimony content in the antimony-containing tin oxide film is 0.2 atom % to 10 atom %.

3. The fuel-cell separator according to claim 1, wherein the antimony-containing tin oxide film has a film thickness of 50 nm or more.

4. The fuel-cell separator according to claim 2, wherein the antimony-containing tin oxide film has a film thickness of 50 nm or more.

5. A method for producing the fuel-cell separator according to claim 1, comprising:
    (b) atomizing a solution containing tin chloride and optionally antimony chloride by ultrasonic wave and supplying the obtained mist-like solution onto the substrate heated to 300° C. to 600° C. to thereby form the first layer; and
    (a) atomizing a solution containing tin chloride and antimony chloride by ultrasonic wave and supplying the obtained mist-like solution onto the first layer on the substrate heated to 300° C. to 600° C. to thereby form the second layer.

* * * * *